US009857161B2

(12) United States Patent
Feng et al.

(10) Patent No.: US 9,857,161 B2
(45) Date of Patent: Jan. 2, 2018

(54) 6DOF ERROR LASER SIMULTANEOUS MEASUREMENT SYSTEM WITH A SINGLE POLARIZATION MAINTAINING FIBER COUPLING AND TRANSMITTING THE DUAL-FREQUENCY LASER

(71) Applicant: Beijing Jiaotong University, Beijing (CN)

(72) Inventors: Qibo Feng, Beijing (CN); Bin Zhang, Beijing (CN); Zhan Gao, Beijing (CN); Cunxing Cui, Beijing (CN)

(73) Assignee: Beijing Jiaotong University, Beijing (CN)

( * ) Notice: Subject to any disclaimer, the term of this patent is extended or adjusted under 35 U.S.C. 154(b) by 0 days.

(21) Appl. No.: 14/419,362

(22) PCT Filed: Sep. 3, 2014

(86) PCT No.: PCT/CN2014/085879
§ 371 (c)(1),
(2) Date: Feb. 3, 2015

(87) PCT Pub. No.: WO2016/033766
PCT Pub. Date: Mar. 10, 2016

(65) Prior Publication Data
US 2017/0167849 A1 Jun. 15, 2017

(51) Int. Cl.
*G01B 11/14* (2006.01)
*G01B 11/00* (2006.01)
*G01B 11/02* (2006.01)
*G01B 11/03* (2006.01)
*G01B 11/24* (2006.01)
*G01B 11/26* (2006.01)

(52) U.S. Cl.
CPC .......... *G01B 11/002* (2013.01); *G01B 11/02* (2013.01); *G01B 11/03* (2013.01); *G01B 11/24* (2013.01); *G01B 11/26* (2013.01)

(58) Field of Classification Search
CPC ....... G01B 11/02; G01B 11/002; G01B 11/24; G01B 11/26; G01B 11/03
USPC ................................. 356/614–640
See application file for complete search history.

(56) References Cited

U.S. PATENT DOCUMENTS

| 4,804,270 A | 2/1989 | Miller et al. |
| 5,798,828 A | 8/1998 | Thomas et al. |
| 6,049,377 A | 4/2000 | Lau et al. |

Primary Examiner — Tri T Ton
(74) Attorney, Agent, or Firm — Hammer & Associates, P.C.

(57) ABSTRACT

A six degree of freedom laser simultaneous measurement system, wherein a laser emitting unit is separated from a fixed sensor head; the laser emitting unit is connected with the fixed sensor head by a single polarization maintaining fiber; a moving unit comprising the reflector and the beam splitter is mounted on the linear guide; utilizing of the single polarization maintaining fiber, which connects the laser emitting unit with the fixed sensor head, reduces the influence of heat generated by laser source on the measurement accuracy, and makes the system more compact and integrated. The six degree of freedom errors, including position error, horizontal and vertical straightness errors, pitch, raw and roll, can be measured simultaneously by only one incident light. The non-cable connection on the moving unit makes long-distance and in-situ measurement possible.

6 Claims, 1 Drawing Sheet

6DOF ERROR LASER SIMULTANEOUS MEASUREMENT SYSTEM WITH A SINGLE POLARIZATION MAINTAINING FIBER COUPLING AND TRANSMITTING THE DUAL-FREQUENCY LASER

FIELD OF THE INVENTION

The present invention relates to a measurement method and apparatus for simultaneously measuring six geometric errors or moving postures of an object while it moves along a linear guide, particularly relates to a laser simultaneous measurement system for errors up to six degree of freedoms and with a single polarization maintaining fiber which couples and transmits dual-frequency laser. The present invention belongs to the field of precise optical measurement technology.

BACKGROUND OF THE INVENTION

High precision linear motion component is the motion reference for CNC machine tool, machining center and CMM. It plays a significant role in maintaining the machining accuracy and measuring accuracy of these equipments. There are six motion errors for a linear motion component, which are three linear displacement errors, including position error, horizontal straightness error and vertical straightness error, and three angular displacement, including pitch, yaw and roll. These errors greatly affect the accuracy and quality of these equipments. Therefore, accurate measurement and effective compensation of these errors are the key to the precision manufacture and measurement.

Commonly, the interferometer is employed to measure these errors. However, only one error component can be measured during each adjustment. Furthermore, different attachments and re-adjusting the interferometer are needed in each measuring process. As a result, the measurement efficiency will be reduced, and the measurement accuracy cannot be guaranteed.

U.S. Pat. No. 4,804,270 discloses a five degree of freedom simultaneous measurement system based on the planar diffraction grating. However, the measurement accuracy is comparatively low, and the position error cannot be measured. Moreover, it is not convenient for in-situ measurement due to the cable connection on the moving sensor head.

U.S. Pat. No. 6,049,377 discloses a five-axis/six-axis measurement system. Five or six degree of freedom errors can be measured simultaneously. However, the measurement accuracy of roll is low, and it is not convenient for long distance measurement due to the cable connection on the moving sensor head.

U.S. Pat. No. 5,798,828 discloses a five degree of freedom measurement system using two lasers. However, the system is not suitable for dynamic measurement in high speed machining due to the large volume moving target. In addition, the position error cannot be measured.

Qibo F, Bin Z, Cunxing C, et al. discloses a six degree of freedom simultaneous measurement system. The system is accomplished by combinational method of homodyne interferometer for position error measurement and laser collimation for other five errors measurement. However the measurement accuracy is affected by the beam drift caused by the heat radiation of the laser. (see *Development of a simple system for simultaneously measuring 6DOF geometric motion errors of a linear guide*[J]. Optics express, 2013, 21(22): 25805-25819).

In general, there are some disadvantages in prior art for six degree of freedom simultaneous measurement as follows: the measurement accuracy is influenced by the heat generated by the laser source which is integrated in the measuring unit; the measurement accuracy of position error, which is measured by homodyne interferometer, is greatly influenced by the measuring environment due to the using of single-frequency laser; it is not convenient for long distance measurement due to the cable connection in moving unit; and the measurement accuracy is influenced by laser beam drift, which is not considered in prior art.

SUMMARY OF THE INVENTION

The object of the present invention is to provide a six degree of freedom measurement system with single fiber coupling dual-frequency laser, which can accomplish high-speed measurement of six degree of freedom error of linear guide. The position error is measured by heterodyne interferometer, therefore the influence caused by measurement environment can be decreased. Furthermore, the laser source is separated from the measurement light path, thus the influence of the laser heat radiation can be decreased, and the measurement accuracy can be improved as well.

Therefore, the present invention provides a 6DOF error simultaneous measurement system, characterized in that a laser emitting unit is separated from the other units, the laser emitting unit is connected with a fixed sensor head by means of a single polarization maintaining fiber, and a moving target/target mirror unit comprising a reflector/beam reflector and a beam splitter is movably engaged with a linear guide.

Preferably, the laser emitting unit consists of a dual-frequency laser, a quarter-wave plate, coupling lens and a polarization maintaining fiber. Two light beams which are left-handed and a right-handed circularly polarized are generated by the dual-frequency laser with equal amplitude and certain frequency difference. The two circularly polarized light beams are transformed to two linearly polarized light beams with the orthogonal polarization direction by the quarter-wave plate. The two linearly polarized lights are coupled into a polarization maintaining fiber by means of the coupling lens, and made to propagate through the fiber with the constant frequency difference and polarization state.

Preferably, the fixed sensor head consists of a fiber exit end, collimating lens, a half-wave plate, a polarization beam splitter, a quarter-wave plate, a reflector, a beam splitter, a mirror, lens, and photodetector.

Preferably, the moving target mirror unit comprises a reflector and a beam splitter.

Preferably, the collimated laser beam is obtained after light transmission in the single polarization maintaining fiber and beam expansion and collimation by the collimating lens. The half-wave plate is rotated in order to align the polarization direction of the two orthogonal linear polarized light beams emitted from the single polarization maintaining fiber with the polarization direction of the reflected light and the transmitted light from the polarization beam splitter. Hence, the intensity of the reflected light and the transmitted light of the polarization beam splitter are adjusted to equal. Part of the beam energy reflected by the polarization beam splitter is directed through the beam splitter, and is reflected by the reflector to serve as the reference beam for interferometric length measurement. The remaining beam energy from the polarization beam splitter is directed into the reflector in the moving target unit, and the reflected beam from the reflector serves as the signal beam. The position error Z is obtained by the beat frequency signal generated by the interference between the reference beam and the signal light on the photodetector in the fixed sensor head.

Preferably, the reflected light from the polarization beam splitter in the fixed sensor head is partially diverted onto the half-wave plate by the beam splitter. The polarization direction of the linearly polarized light passing through the half-wave plate is aligned with the polarization direction of the transmitted light from the polarization beam splitter through rotating the half-wave plate. The linearly polarized light is transformed to circularly polarized light through the quarter-wave plate, and is directed onto the beam splitter in the moving unit. The beam energy passing through the beam splitter is reflected back to the fixed sensor head by the reflector in the moving unit. The photodetector in the fixed sensor head receives the reflected light, and the horizontal straightness error $\Delta X1$ and the vertical straightness error $\Delta Y1$ of the moving target unit with respect to the light axis are obtained.

Preferably, the reflected light from the beam splitter in the moving unit passes through the quarter-wave plate in the fixed unit, and is transformed from the circularly polarized light to the linearly polarized light, and is totally reflected by the polarization beam splitter. The light is then reflected by the mirror and is focused by the lens onto the photodetector which is placed at the focal point of the lens. The angular displacements of pitch $\alpha$ and yaw $\beta$ of the moving unit with respect to the light axis are obtained.

Preferably, the transmitted light from the polarization beam splitter in the fixed sensor head is directed onto the reflector in the moving unit, and is then twice reflected by two beam splitters in the fixed sensor head. The photodetector in the fixed sensor head receives the reflected light, and the horizontal straightness error $\Delta X2$ and vertical straightness error $\Delta Y2$ are then obtained;

Preferably, the roll error $\gamma$ is obtained by dividing the difference of the vertical straightness errors $\Delta Y1$ and $\Delta Y2$ in two different points at the same horizontal position with the distance between the transmitted light from the polarization beam splitter and the reflected light from the beam splitter in the fixed sensor head.

Preferably, the transmitted light from the beam splitter in the fixed sensor head is reflected by the mirror, and is focused on the photodetector so as to obtain the beam angular drift $\alpha'$ and $\beta'$ with respect to the emergent light from the collimating lens. Due to the common path between the compensating path and the measuring path, two dimensional straightness errors, pitch and yaw are compensated according to the beam angular drift and the corresponding error model. The random error introduced by the beam drift is decreased, and the measurement accuracy is enhanced as well.

Preferably, the laser emitting unit based on the transmission through single polarization maintaining fiber is connected with the fixed sensor head by mechanical structure.

Compared with the prior art, the advantages of the present invention are as follows:

Firstly, the use of single fiber coupling dual-frequency laser can effectively separate the laser source from the measurement light path, thus eliminating the influence of heat generated by laser source on the measurement. The beam drift can be decreased by fixing the fiber exit end. In addition, the system is simpler and more integrated with the use of single fiber.

Secondly, the six errors, which are position error, two dimensional straightness errors, pitch, yaw and roll, can be measured simultaneously with only one incident laser beam.

Thirdly, the moving unit which moves along the linear guide is of small volume and simple structure with fewer optical elements. The character of non-cable connection can meet the need of long-distance measurement.

Fourthly, the beam angular drift can be obtained through the common path method, and the measurement accuracy can be further improved by error compensation.

According to the present invention, a single fiber is used to couple and transmit dual-frequency laser, i.e. transmit a dual-frequency laser with coupling effect, therefore heat from the laser head can be separated effectively; Moreover, by using a single fiber to transmit and couple the dual-frequency laser, the structure of the laser emitting unit become simplified.

According to the present invention, with only one laser beam, 6DOF errors can be measured simultaneously with correction of light drift, and as the moving target does not have any cable, the present invention can be used for long distance measurement.

According to the present invention, the moving target has no cable connection, the measuring light path is simple, the volume of apparatus is small, the measurement precision is high. Without heat resource influence, the measurement becomes more stable. With a small measurement heads, a dynamic response of the in-situ measurement becomes faster.

DESCRIPTION OF THE ACCOMPANYING DRAWINGS

DESCRIPTION OF THE PREFERRED EMBODIMENTS

Figure 1:
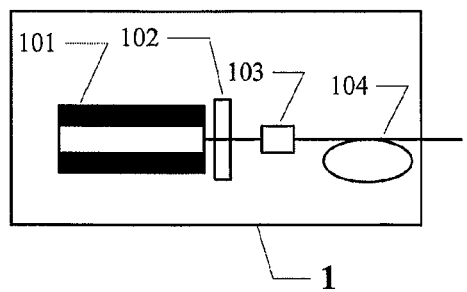
FIG. 1 is a schematic diagram of a laser emitting unit which utilizes a single fiber to couple and transmit a dual-frequency laser.

FIG. 1 shows a laser emitting unit, in which a single fiber is used to couple and transmit the dual-frequency laser. The laser emitting unit consists of a dual-frequency laser 101, a quarter-wave plate 102, a coupling lens 103 and a polarization maintaining fiber 104. The dual-frequency laser 101 generates two light beams, which are left-handed and right-handed circularly polarized light beams respectively, with certain frequency difference and equal amplitude. The two circularly polarized light beams pass through the quarter-wave plate 102, and are transformed to linearly polarized light with orthogonal polarization direction. The two linearly polarized light beams are coupled into the polarization maintaining fiber 104 by the coupling leans 103. Meanwhile, the polarization direction of the linearly polarized light is aligned to the direction of light axis of polarization maintaining fiber by rotating the quarter-wave plate 102. Then, the two beams of linearly polarized light are transmitted in the polarization maintaining fiber with the constant frequency difference and polarization state.

The polarization maintaining fiber 104 can be a "bow-tie" style polarization maintaining fiber or a "panda" style polarization maintaining fiber.

Figure 2:
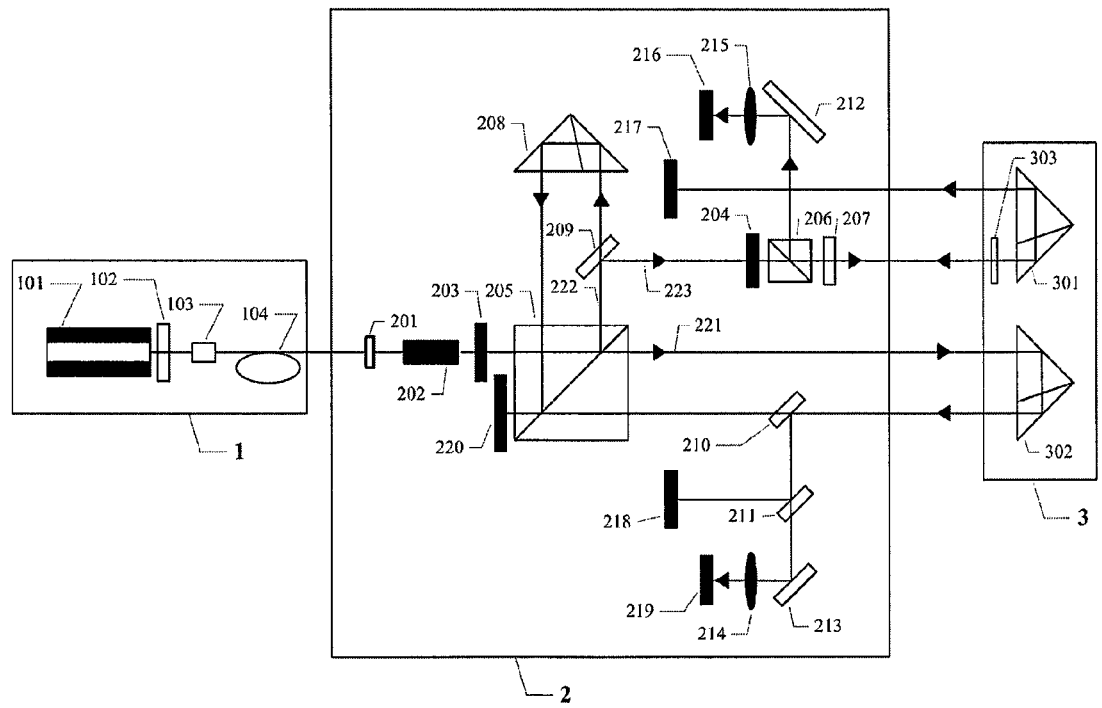
FIG. 2 is a schematic diagram of an embodiment of a six-degree-of-freedom error simultaneous measurement system based on a single fiber coupling dual-frequency laser with compensation for beam drift.

Referring now to FIG. 2, the six-degree-of-freedom error simultaneous measurement system will now be described in detail. The system consists of a laser emitting unit 1, a fixed sensor head 2 and a moving target unit 3. The laser emitting unit 1 is connected with the fixed sensor head 2 by single fiber. The moving unit 3 is mounted on the linear guide, and is made to move along the linear guide in measurement.

The preferred embodiment of the laser emitting unit is shown in FIG. 1.

The fixed sensor head 2 consists of a fiber exit end 201, collimating lens 202, half-wave plate 203 and 204, polarization beam splitter 205 and 206, quarter-wave plate 207, reflector 208, beam splitter 209, 210 and 211, mirror 212 and 213, lens 214 and 215, and photodetector 216, 217, 218, 219 and 220.

The moving unit 3 comprises reflector 301 and 302, and beam splitter 303.

The laser exit end 201 is placed at the focal point of the collimating lens 202, and the light emitted from the fiber can be collimated by the collimating lens 202. Rotating the half-wave plate 203, the polarization directions of the two orthogonal linearly polarized light beams emitted from the single polarization maintaining fiber 104 are aligned with the polarization directions of the reflected light and the transmitted light of the polarization beam splitter 205. Hence, the intensities of the reflected light and the transmitted light from the polarization beam splitter 205 are equal. The reflected light 222 from the polarization beam splitter 205 is directed through the beam splitter 209, and is reflected by the reflector 208 to serve as the reference beam for interferometric length measurement. The transmitted light 221 from the polarization beam splitter 205 is directed into the reflector 302 in the moving unit 3, and the reflected light from the reflector 302 serves as the signal beam. The position error Z of the moving unit 3 along a machine or a linear guide is obtained by the beat frequency signal, which is generated by the interference between the reference beam and the signal beam on the photodetector 220 in the fixed sensor head 2.

The reflected light 222 from the polarization beam splitter 205 in the fixed sensor head 2 is partially diverted onto the half-wave plate 204 by the beam splitter 209. Rotating the half-wave plate 204, the polarization directions of the linearly polarized light beams passing through the half-wave plate 204 is aligned with the polarization directions of the transmitted light from the polarization beam splitter 206. The linearly polarized light is transformed into circularly polarized light through the quarter-wave plate 207, and is directed onto the beam splitter 303 in the moving unit 3. The beam energy passing through the beam splitter 303 is reflected back to the fixed sensor head 2 by the reflector 301 in the moving unit 3. The photodetector 217 in the fixed sensor head 2 receives the reflected light, and the horizontal straightness error $\Delta X1$ and the vertical straightness error $\Delta Y1$ of the reflector 301 with respect to the light axis are then obtained.

The reflected light from the beam splitter 303 passes through the quarter-wave plate 207, and is transformed from circularly polarized light to linearly polarized light, and is totally reflected by the polarization beam splitter 206. The light is then reflected by the mirror 212 and is focused by the lens 215 onto the photodetector 216 which is placed at the focal point of the lens 215. Then, the angular displacements of pitch $\alpha$ and yaw $\beta$ of the moving unit with respect to the light axis are obtained.

The transmitted light 221 from the polarization beam splitter 205 is directed onto the reflector 302 in the moving unit 3, and is then twice reflected by the beam splitters 210 and 211 in the fixed sensor head 2. The photodetector 218 in the fixed sensor head 2 receives the reflected light from the beam splitter 211, and then, the horizontal straightness error $\Delta X2$ and the vertical straightness error $\Delta Y2$ of the reflector 302 are obtained.

The transmitted light from the beam splitter 211 in the fixed sensor head 2 is reflected by the mirror 213 and is focused onto the photodetector 219 by the lens 214. Then, the beam angular drift $\alpha'$ and $\beta'$ with respect to the emergent light from the collimating lens 201 are obtained.

$\Delta Y1$ and $\Delta Y2$, which are the vertical straightness errors at two different points with the same horizontal position in the moving component of a linear guide or a machine tool, can be measured by the photodetector 217 and 218. The roll error $\gamma$ is obtained by dividing the difference of $\Delta Y1$ and $\Delta Y2$ with the distance between the transmitted light 221 from the polarization beam splitter 205 and the reflected light 223 from the beam splitter 209 in the fixed sensor head 2.

The polarization beam splitters 205 and 206 include polarization beam splitter PBS and Glan-Thompson polarization beam splitter.

The reflectors 301, 302 and 208 include corner-cube reflector, rectangle prism and cat-eye.

Therefore, the present invention realizes the simultaneous measurement of six-degree-of-freedom errors based on a single fiber coupling dual-frequency laser with compensation for laser beam drift.

Compared with the prior art, the prominent advantages of the present invention are as follows:

Firstly, the single fiber separates the laser source from the measurement light path, thus the influence of heat generated by laser source is decreased, and the measurement accuracy is improved.

Secondly, the size of the fixed sensor head 2 can be highly reduced since the dual-frequency laser 101 is located outside of the fixed sensor head 2. In this way, the miniaturized system configuration and highly integrated assembly is accomplished.

Thirdly, only one polarization maintaining fiber is used to couple and transmit the dual-frequency laser in the present invention with no extra beam splitting and coupling process. The arrangement of laser emitting unit 1 is simple, and is convenient to assemble and adjust.

Fourthly, the six errors, which are position error, two dimensional straightness errors, pitch, yaw and roll, can be measured simultaneously with only one incident laser beam. The moving unit 3 is of small volume and simple structure with fewer optical elements. The character of non-cable connection can meet the need of long-distance measurement.

Fifthly, the influence of laser beam drift can be decreased by using the common path method, and the measurement accuracy can be further improved by error compensation.

The invention claimed is:

1. A laser measurement system for simultaneously measuring six degree of freedom geometric errors, wherein the laser measurement system has a laser emitting unit, a fixed sensor head, and a moving target unit;
the laser emitting unit is connected to the fixed sensor head by a single fiber;
the moving target unit is mounted on a linear guide, and moves along the linear guide during measurement;
the laser emitting unit further consists of:
a dual-frequency laser, a quarter-wave plate, a coupling lens, and the single fiber is a polarization maintaining fiber;
two light beams, each with an amplitude and are circularly polarized, are left-handed and right-handed and are generated by the dual-frequency laser, the two light beams have the same amplitude, and the two light beams have a frequency difference; the two circularly polarized light beams are transformed to two linearly polarized light beams with an orthogonal polarization direction by the quarter-wave plate; the two linearly polarized light beams are coupled into the polarization maintaining fiber by the coupling lens; the polarization maintaining fiber transmits the two linearly polarized light beams, wherein the two linearly polarized light beams are kept with the frequency difference and in the polarization state, the fixed sensor head includes a fiber exit end, a collimating lens, a half wave plate, a polarization beam splitter, a quarter wave plate, a reflector, a beam splitter, a mirror, a lens, and a photodetector;

the moving target unit includes two reflectors and a beam splitter and is in engagement with the linear guide;

the laser emitting unit, based on transmission through the single polarization maintaining fiber, is connected with the fixed sensor head.

2. The system of claim 1, wherein a collimated laser beam is obtained after a light beam is transmitted to pass through the single polarization maintaining fiber and the light beam is expanded and collimated by the collimating lens; the half-wave plate is rotated in order to align the polarization direction of the two orthogonal linear polarized light beams emitted from the single polarization maintaining fiber with the polarization direction of the light transmitted through and the light reflected from the polarization beam splitter, so as to make the intensity of the light beam transmitted through the polarization beam splitter and the intensity of the light beam reflected from the polarization beam splitter to be equal with each other, a part of the beam energy reflected by the polarization beam splitter is directed through the beam splitter, and is reflected by the reflector to serve as a reference beam for interferometric length measurement; the remaining beam energy from the polarization beam splitter is directed into the reflector in the moving target unit, and the reflected beam from the reflector serves as a signal beam; the position error Z when the moving target mirror unit moves along a machine tool or its guiding rail is obtained by the beat frequency signal generated by the interference between the reference beam and the signal light on the photodetector in the fixed sensor head.

3. The system of claim 1, wherein the reflected light from the polarization beam splitter in the fixed sensor head is partially diverted onto the half-wave plate by the beam splitter; the polarization direction of the linearly polarized light passing through the half-wave plate is aligned with the polarization direction of the transmitted light from the polarization beam splitter through rotating the half-wave plate; the linearly polarized light is transformed to a circularly polarized light through the quarter-wave plate, and is directed onto the beam splitter in the moving target unit; the beam energy passing through the beam splitter is reflected back to the fixed sensor head by the reflector in the moving target unit; the photodetector in the fixed sensor head receives the reflected light, so that the horizontal straightness error $\Delta X1$ and the vertical straightness error $\Delta Y1$ of the moving target unit with respect to the light axis are obtained.

4. The system of claim 1, wherein the reflected light from the beam splitter in the moving target unit passes through the quarter-wave plate in the fixed unit again, and is transformed from the circularly polarized light to the linearly polarized light, but the polarization direction has a 90 degree change as before, so that the reflected light is totally reflected by the polarization beam splitter; the light is then reflected by a mirror and is focused by lens onto a photodetector which is placed at the focal point of the lens, so that the angular displacements of pitch $\alpha$ and yaw $\beta$ of the moving target unit with respect to the light axis are obtained.

5. The system of claim 1, wherein the transmitted light from the polarization beam splitter in the fixed sensor head is directed onto the reflector in the moving target unit, and is then twice reflected by two beam splitters in the fixed sensor head; the photodetector in the fixed sensor head receives the reflected light, so that the horizontal straightness error $\Delta X2$ and vertical straightness error $\Delta Y2$ are then obtained; and the roll error $\gamma$ is obtained by dividing the difference of the vertical straightness errors $\Delta Y1$ and $\Delta Y2$ in two different points at the same horizontal position with the distance between the transmitted light from the polarization beam splitter and the reflected light from the beam splitter in the fixed sensor head.

6. The system of claim 1, wherein the transmitted light from the beam splitter in the fixed sensor head is reflected by a mirror, and is focused on a photodetector to obtain the beam angular drift $\alpha'$ and $\beta'$ with respect to the emergent light from the collimating lens; due to the compensating path is just the measuring path, two dimensional straightness errors, pitch and yaw are compensated according to the beam angular drift and the corresponding error model; the random error introduced by the beam drift is decreased, and the measurement accuracy is enhanced as well.

* * * * *